United States Patent
Peon et al.

(10) Patent No.: US 7,209,890 B1
(45) Date of Patent: Apr. 24, 2007

(54) SYSTEM AND METHOD FOR REPLENISHING A WIRELESS TERMINAL ACCOUNT

(75) Inventors: Roberto Peon, Atlanta, GA (US); Luisa Treadway, Auburn, GA (US); Bruce Cotton, Decatur, GA (US); Catherine Meade Lowance, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 732 days.

(21) Appl. No.: 10/177,620

(22) Filed: Jun. 20, 2002

(51) Int. Cl.
*G06Q 18/00* (2006.01)
(52) U.S. Cl. ............................. 705/17; 705/18; 455/408
(58) Field of Classification Search ................ 705/21, 705/18, 17, 16, 24; 235/375; 455/407, 408, 455/406
See application file for complete search history.

(56) References Cited

U.S. PATENT DOCUMENTS

| | | | | |
|---|---|---|---|---|
| 6,144,847 A * | 11/2000 | Altschul et al. | ............ | 455/407 |
| 6,185,545 B1 * | 2/2001 | Resnick et al. | ............... | 705/40 |
| 6,236,851 B1 * | 5/2001 | Fougnies et al. | ........... | 455/408 |
| 2002/0091572 A1 * | 7/2002 | Anderson et al. | ............. | 705/16 |
| 2002/0107007 A1 * | 8/2002 | Gerson | ........................ | 455/414 |
| 2002/0107738 A1 * | 8/2002 | Beach et al. | .................. | 705/14 |
| 2002/0143634 A1 * | 10/2002 | Kumar et al. | ................. | 705/18 |
| 2002/0156683 A1 * | 10/2002 | Sloutenburg et al. | ......... | 705/16 |
| 2003/0126020 A1 * | 7/2003 | Smith et al. | .................. | 705/21 |

FOREIGN PATENT DOCUMENTS

WO   WO 9216078 A1 *  9/1992

OTHER PUBLICATIONS

Levy, Ira D., "Keeping the bells ringing: Account replenishment in near real time", TMA Journal, v19n2, p. 24-26, Mar./Apr. 1999.*

* cited by examiner

*Primary Examiner*—F. Zeender
(74) *Attorney, Agent, or Firm*—Withers & Keys, LLC

(57) ABSTRACT

A system and method for replenishing a wireless terminal account of a customer of a telecommunication service provider. In one embodiment the method includes transmitting through a point-of-sale device a merchant identification, a customer mobile identification number and an amount to the telecommunication service provider. The method also includes validating the merchant identification and crediting the customer account. The method may include delivering a merchant confirmation to the point-of-sale device and delivering a customer confirmation to the customer's wireless terminal.

23 Claims, 4 Drawing Sheets

| QUERY | RESPONSE |
|---|---|
| ENTER MERCHANT ID | 1234... |
| ENTER POS IN | 5001... |
| ENTER CUSTOMER MIN | 7342... |
| ENTER AMOUNT IN ___ CURRENCY | 25 |
| DISCONNECT AND WAIT FOR CONFIRMATION | ----- |

FIG. 3

SYSTEM AND METHOD FOR REPLENISHING A WIRELESS TERMINAL ACCOUNT

BACKGROUND

Various prepaid and other methods of payment are available to customers of wireless telecommunication services. When a prepaid amount in a customer's account is exhausted, the customer may replenish the amount by buying a new prepaid card, or by calling a toll-free number to make a payment or by paying an invoice. It may be desirable to make such replenishment methods secure and fraud-resistant without compromising convenience for customers that reside in wide-ranging service areas.

U.S. Pat. No. 6,236,851 discloses a prepaid security cellular telecommunications system. U.S. Pat. No. 6,185,545 discloses an electronic payment system utilizing an intermediary account. U.S. Pat. No. 6,144,847 discloses a wireless telephone with credited airtime.

SUMMARY

One embodiment of the invention provides a method for replenishing a wireless terminal account of a customer of a telecommunication service provider. In one embodiment, the method includes transmitting via a point-of-sale device a merchant identification, a customer mobile identification number and an amount to the telecommunication service provider. The method may also include validating the merchant identification and crediting the customer account. The method may include delivering a merchant confirmation to the point-of-sale device and delivering a customer confirmation to the customer's wireless terminal.

BRIEF DESCRIPTION OF THE DRAWINGS

In the accompanying Figures, there are shown present embodiments of the invention wherein like reference numerals are employed to designate like parts and wherein:

FIG. 3 is tabular representation of an embodiment of an Interactive Voice Response dialog according to the present invention.

DETAILED DESCRIPTION OF THE INVENTION

Figure 1:
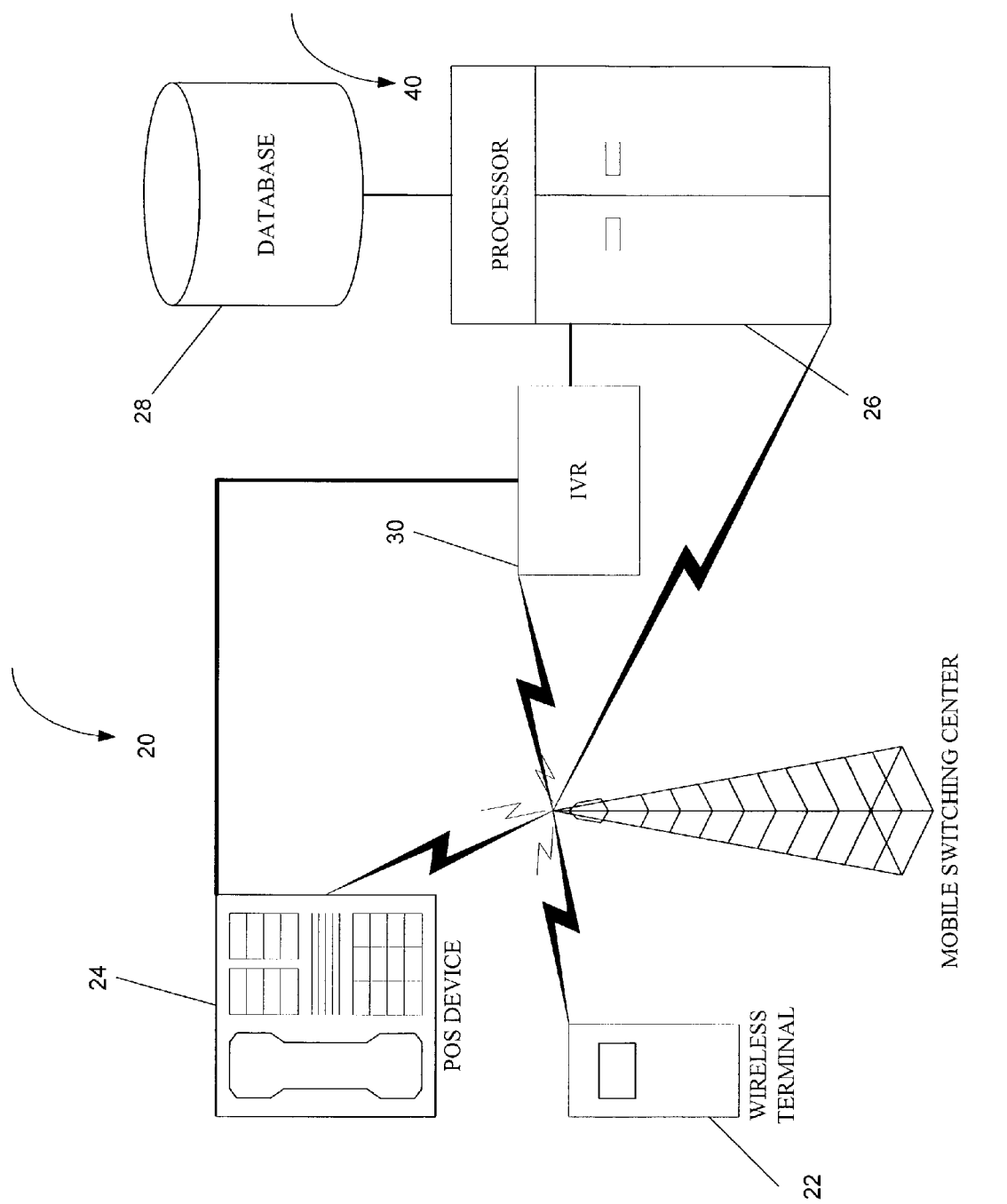
FIG. 1 is a diagram showing an embodiment of a system for replenishing a wireless terminal account according to the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

FIG. 1 is a diagram of an embodiment of a system 20 for the replenishment of an account for a customer of a wireless telecommunication service provider (hereinafter "TSP"). The system 20 may comprise a wireless terminal 22 associated with the customer's account and a point-of-sale device 24 (hereinafter "POS device"). The POS device 24 may be, for example, in the custody of a merchant who offers replenishment services in addition to engaging in the sale of any other services or goods.

For security and fraud-avoidance purposes, for example, the TSP may issue an identification number (hereinafter "merchant ID") to each merchant who participates in the account replenishment program. The customer's wireless terminal 22 may be identified by a mobile identification number (hereinafter "customer MIN") provided by the TSP. The POS device 24 may also have an identification number (hereinafter "POS IN") associated with it and issued by the TSP.

The POS device 24 may be, for example, a wireless analog or digital handset, a battery-powered handset or a cordless handset or a hard-wired telephone apparatus. It may be dedicated to replenishment purposes or it may also include the functions and capabilities of a telephone handset. Additionally, it may be operated with a credit card scanner, a cash register, etc. The POS device 24 may also be provided with a calling number ID.

In one embodiment, the POS device 24 may be specifically provided by the TSP and it may be restricted to dialing only, for example, one toll-free number or another number to initiate the replenishment process. All other inbound and inbound calls from the POS device 24 may be blocked with the exception of the refresh toll-free access number. Such blocking may be accomplished by known methods, such as the methods used to setup emergency services. This is accomplished by providing a switch that hotlines the POS device 24 to a specified number for all outgoing calls except emergency calls and customer care calls.

The POS device 24 may be configured for entering data, such as, for example, the merchant ID, the customer MIN and the replenishment amount. The POS device 24 may transmit data via hard-wired telephony, satellite, the Internet or other radio transmittal methods and devices that communicate with an accounting center 40 belonging to the TSP and including a Prepaid Platform for prepaid wireless accounts. The accounting center 40 may include a processor 26 linked to a database 28, which includes customer and merchant account records and the respective customer MINs, merchant IDs and POS INs. The telecommunication service provider may establish a plurality of accounting centers throughout its service areas to accommodate customers residing in urban, suburban, and rural or other remote locations.

The POS device 24 may communicate with the accounting center 40 via an Interactive Voice Response module 30 (hereinafter "IVR module") over a Local or Wide Area Network.

Figure 2:
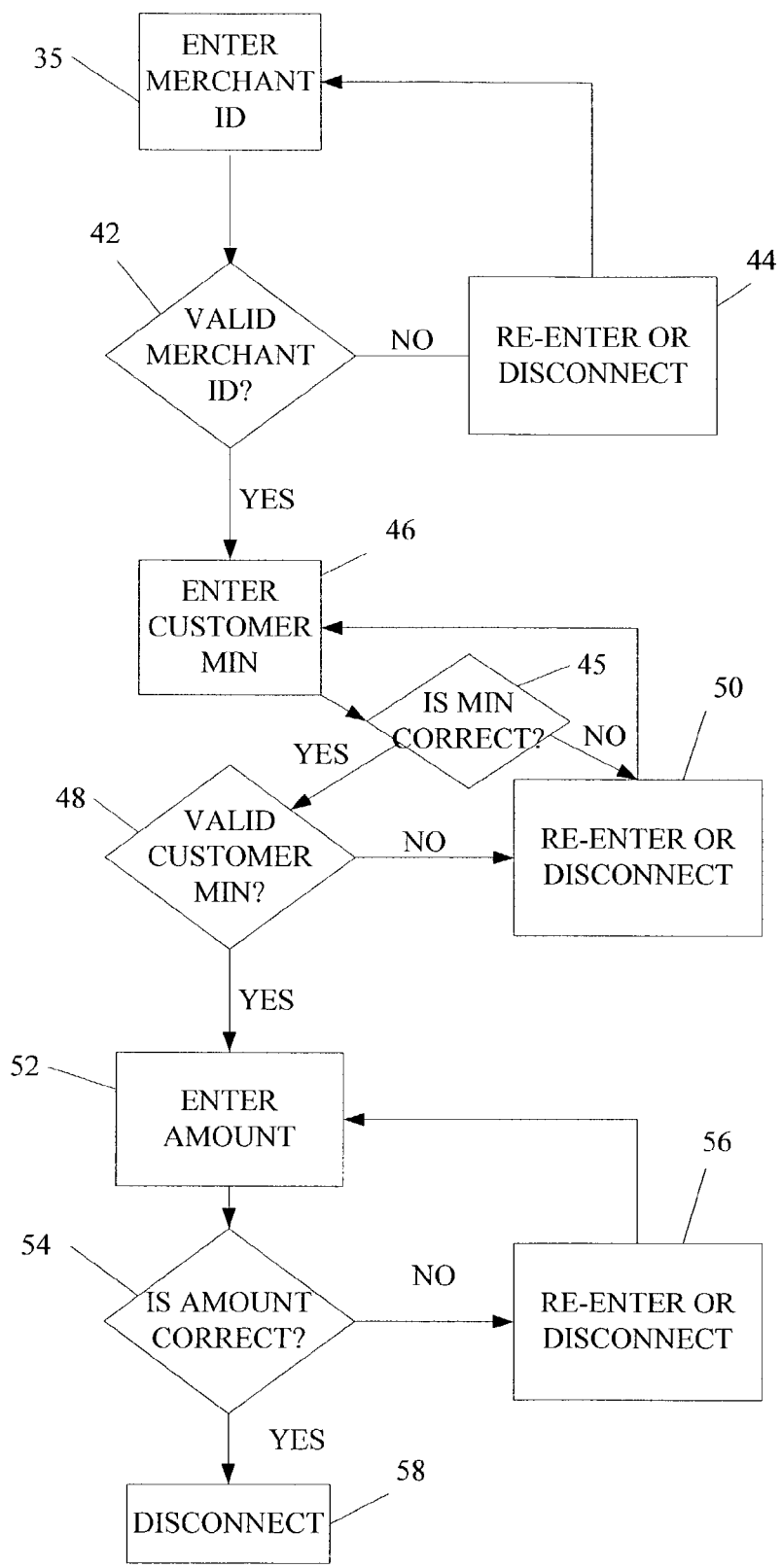
FIG. 2 is a flowchart illustrating an embodiment of method for replenishing a wireless terminal account according to the present invention.

The merchant may dial a number via either a wired or preferably a wireless connection and communicate with the accounting center 40 through the IVR module 30. In one exemplary embodiment, shown in FIG. 2, the IVR module 30 prompts the merchant to enter the merchant ID at step 35. The merchant ID is compared by the processor 26 against a table of merchant IDs and corresponding POS INs for validation at step 42. The POS IN may either be transmitted automatically at the initiation of the call from the corresponding POS device 24, or may be entered manually by the merchant during the IVR dialog. If the merchant's ID cannot be validated, the merchant may, for example, be asked to re-enter the merchant ID or disconnect at step 44.

Once the merchant ID is validated, the IVR module 30 prompts the merchant to enter the customer's MIN at step 46. The IVR module 30 may repeat the customer's MIN for confirmation at step 45. If the MIN was not entered correctly, the customer is asked to re-enter the MIN at step 50. If the MIN is entered correctly, the MIN is compared against a table of active customer MINs in the database 28 at step 48. If the customer's MIN cannot be validated, the merchant may be asked to re-enter the MIN or disconnect at step 50. After the customer's MIN is validated, the IVR module 30 prompts the merchant to enter the amount of replenishment at step 52. The IVR module 30 may also prompt the merchant to verify the amount at step 54 and to re-enter the amount at step 56 or to disconnect at step 58.

The IVR module 30 may also prompt the merchant to enter the POS IN, and then validate the POS IN against the merchant ID in a corresponding table in the database 28. Alternatively, the calling number ID of the POS device 24 may be validated by comparing it in a table in the database 28. An example of the query/answer dialog is illustrated in tabular form in FIG. 3. After all the information is entered, the merchant may be instructed to disconnect and wait for a confirmation.

The IVR module 30 may record the information received from the merchant. The information received is processed by the processor 26 to validate the merchant ID and/or the calling number ID and to update the customer's account records in the database 28.

Figure 4:
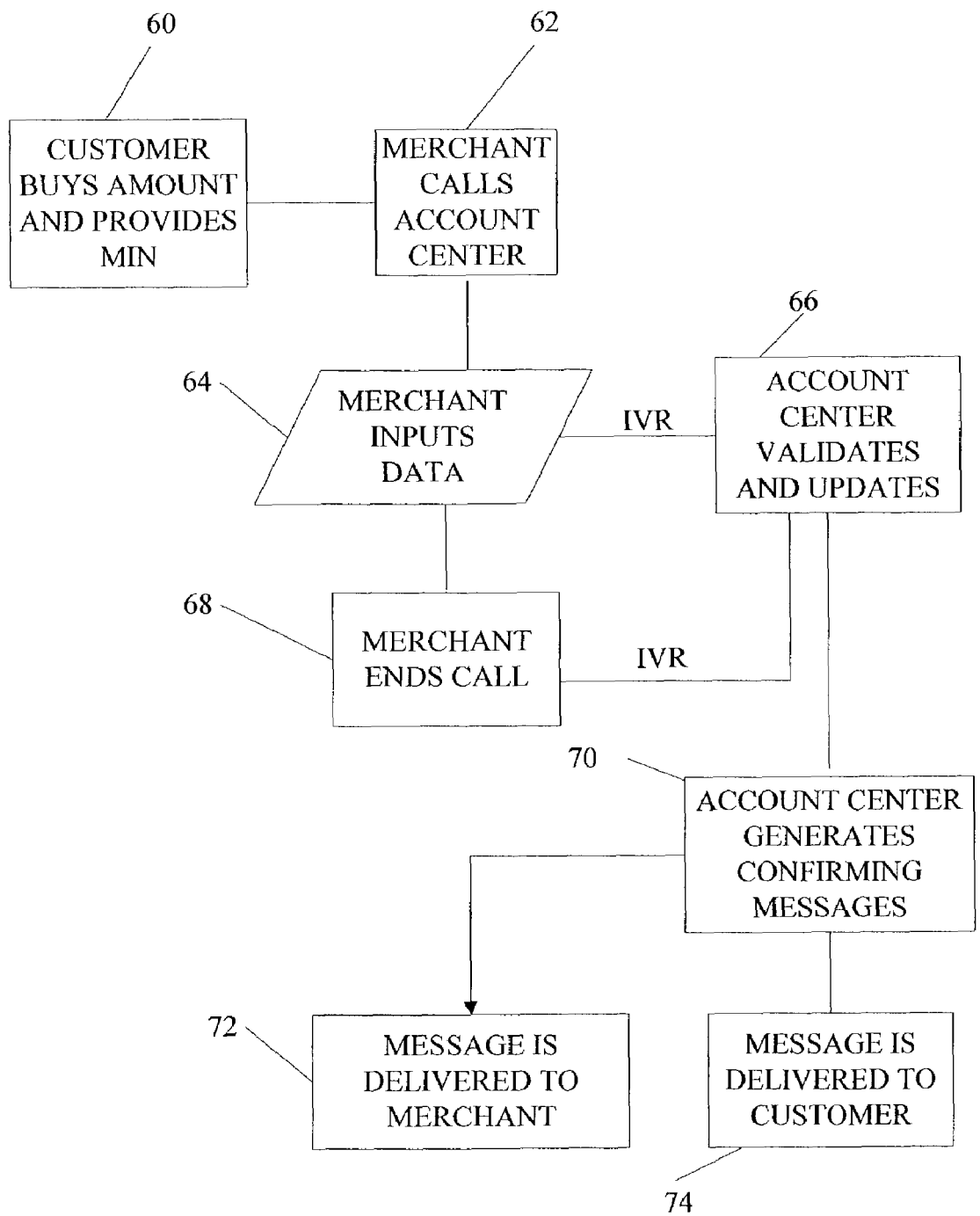
FIG. 4 is a flowchart illustrating an embodiment of a method for replenishing a wireless terminal account according to the present invention.

FIG. 4 illustrates an embodiment of the operation of the system. The customer visits the merchant and buys a replenishment amount for the customer's wireless terminal. The customer also gives its MIN to the merchant at step 60. The merchant uses its POS device 24 to call the account center 40 of the TSP at step 62. The merchant then inputs the relevant data, such as the merchant ID, the POS IN, the customer MIN and the replenishment amount at steps collectively designated as 64. Such inputting may be carried out, for example, interactively through the IVR module 30. The IVR module 30 communicates with the accounting center 40 to validate the identifications and update the customer's account at steps generally designated 66. The merchant may then be instructed to terminate the call at step 68. The accounting center generates confirming messages at step 70. A confirming message may be delivered to the merchant at step 72, and to the customer at step 74.

The confirming message to the merchant may be delivered through, for example, a short message service (hereinafter "SMS") message, which may be delivered without requiring the POS device 24 to be in active mode or within range. Additionally, the SMS messages may remain on the POS device 24 until manually deleted by the merchant or overwritten by subsequent messages. The number of messages that may be stored on the POS device 24 depends on the manufacturer of the device and the features setup.

The confirming message to the customer's wireless terminal 22 may also be in the form of an SMS text message if the customer's terminal 22 supports such messaging. The confirming message may also be delivered as a toll-free call to the customer's wireless terminal 22. Furthermore, the conforming message to the customer may be delivered directly to the customer as a receipt from the merchant.

The merchant may also keep an electronic or paper record of the communication and provide the customer with a receipt of the transaction.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A method for replenishing a wireless terminal account of a customer of a telecommunication service provider, the method comprising:

transmitting through a point-of-sale device a merchant identification, a customer mobile identification number for a wireless terminal of the customer for which the wireless terminal account corresponds such that the replenishment allows for continued use of the wireless terminal, and a monetary amount to the telecommunication service provider;

validating the merchant identification by comparing the merchant identification against a table comprising a plurality of merchant identifications and corresponding point-of-sale device identification numbers, wherein a point-of-sale identification number associated with the point-of-sale device is automatically transmitted at the initiation of a communication from the point-of-sale device to initiate replenishment of the wireless terminal account;

crediting the customer's wireless terminal account in accordance with the monetary amount;

delivering a merchant confirmation message about the crediting of the customer's wireless terminal account to the point-of-sale device; and delivering a customer confirmation message about the crediting of the customer's wireless terminal account to the customer's wireless terminal for which the customer's wireless terminal account corresponds.

2. The method of claim 1, wherein the point-of-sale device is a wireless handset.

3. The method of claim 1, wherein the point-of-sale device is connected to a credit card scanner.

4. The method of claim 1, wherein the merchant confirmation message is a text message.

5. The method of claim 1, wherein the customer confirmation message is a text message.

6. The method of claim 1, wherein the customer confirmation message is a telephone call message.

7. The method of claim 1, wherein the customer confirmation message is a voice message.

8. The method of claim 1, wherein in addition to the customer confirmation message to the customer's wireless terminal, the method further comprises providing a receipt to the customer from the merchant.

9. The method of claim 1, wherein transmitting includes communicating interactively.

10. The method of claim 1, wherein transmitting includes communicating via an interactive voice response module.

11. The method of claim 1, wherein validating includes comparing against a database of the telecommunication service provider.

12. The method of claim 1, further comprising transmitting a point-of sale identification number to the telecommunication service provider for validation.

13. The method of claim 1, further comprising transmitting a calling number identification for the point-of sale device to the telecommunication service provider for validation.

14. A system for replenishing a wireless terminal account of a customer of a telecommunication service provider, the system comprising:
- a point-of-sale device operable to transmit a merchant identification, a mobile identification number for the customer's wireless terminal that corresponds to the wireless terminal account such that replenishing the wireless terminal account provides for continued use of the customer's wireless terminal, and an amount to the telecommunication service provider;
- a storage device for storing customer and merchant records; and
- a processor in communication with the storage device and operable to validate the merchant identification by comparing the merchant identification against a table comprising a plurality of merchant identifications and corresponding point-of-sale device identification numbers, wherein a point-of-sale identification number associated with the point-of-sale device is automatically transmitted at the initiation of a communication from the point-of-sale device to initiate replenishment of the wireless terminal account, wherein the processor is further operable to validate a point-of-sale identification number associated with the point-of-sale device against the merchant identification in a database table, and validate the mobile identification number by comparing the mobile identification number against a table of active mobile identification numbers, to credit the customer's wireless terminal account in accordance with the amount and to transmit a merchant confirmation message about the credit to the point-of-sale device and a customer confirmation message about the credit to the customer's wireless terminal that corresponds to the wireless terminal account.

15. The system of claim 14, wherein the point-of-sale device includes a wireless handset.

16. The system of claim 14, wherein the point-of-sale device is connected to a credit card scanner.

17. The system of claim 14, wherein the point-of-sale device is connected to a cash register.

18. The system of claim 14, further including an interactive voice response module in communication with the processor.

19. The system of claim 14, wherein the merchant confirmation message is a text message.

20. The system of claim 14, wherein the customer confirmation message is a text message.

21. The system of claim 14, wherein the customer confirmation message is a voice message.

22. The system of claim 14, wherein in addition to the customer confirmation message to the wireless terminal, the point-of-sale device generates a receipt from the merchant to the customer.

23. A system for replenishing a wireless terminal account of a customer of a telecommunication service provider, the system comprising:
- means for transmitting a merchant identification, a mobile identification number for the customer's wireless terminal that corresponds to the wireless terminal account such that replenishment provides for continued use of the customer's wireless terminal, and an amount to the telecommunication service provider;
- means for storing customer and merchant records; and
- processing means in communication with the storage means for validating the merchant identification by comparing the merchant identification against a table comprising a plurality of merchant identifications and corresponding point-of-sale device identification numbers, wherein a point-of-sale identification number associated with the means for transmitting is automatically transmitted at the initiation of a communication from the means for transmitting to initiate replenishment of the wireless terminal account, validating the mobile identification number by comparing the mobile identification number against a table of active mobile identification numbers, crediting the customer's wireless terminal account in accordance with the amount and transmitting a merchant confirmation message about crediting the customer's wireless terminal account to the means for transmitting and a customer confirmation message about crediting the customer's wireless terminal account to the wireless terminal corresponding to the wireless terminal account.

* * * * *